United States Patent [19]

Noguchi et al.

[11] 4,136,210
[45] Jan. 23, 1979

[54] PROCESS FOR PRODUCTION OF TEXTURAL PROTEIN FOOD MATERIAL FROM KRILLS

[75] Inventors: Akinori Noguchi, Tokyo; Susumu Kimura, Tachikawa; Keiji Umeda, Tokyo, all of Japan

[73] Assignee: Director of National Food Research Institute, Tokyo, Japan

[21] Appl. No.: 845,535

[22] Filed: Oct. 26, 1977

[30] Foreign Application Priority Data

Jun. 17, 1977 [JP] Japan .................................. 52-71088

[51] Int. Cl.$^2$ ................................................. A23J 3/00
[52] U.S. Cl. ..................................... 426/657; 426/515; 426/524; 426/802
[58] Field of Search ............... 426/656, 657, 515, 524, 426/802, 104

[56] References Cited

U.S. PATENT DOCUMENTS

| | | | |
|---|---|---|---|
| 3,594,192 | 7/1971 | Mullen et al. | 426/656 X |
| 3,920,853 | 11/1975 | Middendorf et al. | 426/574 X |
| 3,922,359 | 11/1975 | Hashizume et al. | 426/574 |
| 4,001,459 | 1/1977 | Kim et al. | 426/802 X |

FOREIGN PATENT DOCUMENTS

| | | | |
|---|---|---|---|
| 991910 | 6/1976 | Canada | 426/657 |
| 47-17821 | 5/1972 | Japan | 426/656 |

*Primary Examiner*—Raymond N. Jones
*Assistant Examiner*—Esther M. Kepplinger
*Attorney, Agent, or Firm*—Flynn & Frishauf

[57] ABSTRACT

A process for producing textural protein food material from krills which is characterized by adjusting the pH of the precipitate obtained by centrifuging the uniformly smashed flesh of the krills to not less than 10, returning the pH to near neutral and then freezing the precipitate to effect texturing.

9 Claims, No Drawings

PROCESS FOR PRODUCTION OF TEXTURAL PROTEIN FOOD MATERIAL FROM KRILLS

BACKGROUND OF THE INVENTION

1. Field of the Invention

The present invention relates to a process for producing textural protein food material from krills. More particularly, it is concerned with a process for production of sponge-like and meat-like, textural protein food material from krills.

2. Description of the Prior Art

A krill is a kind of animal plankton living in the ocean and is a shrimp-like crustacean having a maximum length of as much as 7 centimeters. In particular, Euphausia sperba living in the Antarctic Oecean is well known as the diet of whales. The quantity of Euphausia sperba is estimated at several hundred millions, and when estimated highly, it amounts to two billions. The krills are of high nutritive value, and their amino acid compositions are said to be superior to those of meat, whale meat, fish meat, and other crutaceans. Thus, they have been attracting attention as protein resources for the future. Therefore, development of a method of utilizing the krills, particularly development in the production of foods from the krills, has been expected.

Hitherto, many methods of utilizing the krill protein as foods have been proposed. For example, the krills are utilized directly as frozen meat, dried foods, foods boiled down in soy, etc, or the krill protein is extracted and utilized, for example, as a flavoring matter or as a concentrated fish protein. In any case, it has long been desired to produce foods of stable quality from the krill protein.

SUMMARY OF THE INVENTION

In accordance with the present invention, we have provided a process for producing textural protein food material from krills which comprises mixing uniformly the flesh of the krills, particularly by the use of a homogenizer or kneader, centrifuging the resulting homogenate to obtain a precipitate, adjusting the pH of the precipitate to at least 10, returning the pH to near neutral, and freezing the precipitate to effect texturing thereof. A calcium salt can be added to the precipitate before it is frozen.

DETAILED DESCRIPTION OF THE INVENTION

As a result of our investigations on the production of foods from the krills, we have developed a process for producing textural protein products from the krill protein. That is to say, fresh krills, which had been frozen immediately after being captured in the Antarctic Ocean, were thawed at room temperature and smashed by the use of rubber rollers to obtain the flesh therefrom. The krill flesh so obtained was homogenized in a homogenizer, and its pH was adjusted to not less than 10 and the adjusted to near neutral. After centrifugation of the resulting homogenate, water was added to the precipitate obtained in an amount of twice as much as by volume, and homogenization ws repeated. The resulting mixture was frozen at near −5° C. for 2 weeks and thawed. In this way, a textural protein was obtained.

With the thus obtained protein, flavor, texture and yield were measured. The results obtained are shown in Table 1.

Table 1

| Influences of Freezing Processing on Krill Protein | | | |
|---|---|---|---|
| | Flavor[1] | Texture[2] | Yield |
| Before Processing | ++ | − | 61% |
| After Processing | + | +++ | 92%. |

[1] Lobster-like flavor
[2] Sponge-like texture
−: Insensible
+: Slightly sensible
++: Sensible
+++: Strongly sensible.

As is apparent from the above results, the freezing processing causes the krill protein to be modified such that it is rich in texture, it is little changed in flavor, and its yield increases.

In the practice of the present invention, fresh krills just after capture thereof, or those krills frozen immediately after capture thereof and thawed immediately before use thereof, can be employed. The krills are used after removing the shell thereof. The removal of the shell can be carried out by a suitable method, for example, by smashing with the use of rubber rollers.

To the krills whose shells have been removed is added, if desired, water in an amount of from 1 to 10 times the volume of the de-shelled krills. The resulting mixture is uniformly mixed by the use of a homogenizer or kneader and centrifuged to obtain a precipitate.

To the precipitate so obtained is added, if desired, water in an amount of from 1 to 4 times the volume of the precipitate. Then a suitable alkali (e.g., caustic soda, caustic potash, etc.) is added thereto to adjust the pH to at least 10. Thereafter, a suitable acid (e.g., hydrochloric acid, sulfuric acid, etc.) is added to the precipitate to return the pH to near neutral, preferably 7. It is suspected that once the pH of the precipitate is adjusted to not less than 10, the structure of the krill protein changes and those functional groups easily reactable, for example, cysteine and the like, appear on the surface thereof, or that the formation of —SH groups owing to hydrolysis of —S—S— bonds in proteins makes proteins easily reactable with each other; then, when the pH is returned to near neutral, the repulsion between molecules based upon the negative charge of the proteins is diminished, and the reaction between the proteins proceeds.

After the pH is adjusted, a calcium salt is added, if desired, to the krill protein homogenate. Typical calcium salts include calcium chloride and calcium sulfate. Calcium chloride is particularly preferred. The calcium salt is added to the homogenate in such an amount that the final concentration is from 0.1 to 2% by weight, preferably from 0.2 to 0.5% by weight. While the objective food material can be obtained without addition of the calcium salt, the addition of the calcium salt improves the texture of the food material and brings about a considerable reduction in time for freezing.

Subsequently, the freezing processing is carried out at a temperature of from −5° C. to −15° C. for at least two days. As to the time for freezing, it requires two weeks at most, and generally a week is sufficient. When the frozen material is thawed, a textural protein food material is obtained.

With the textural protein food material obtained by the process of the present invention, it is possible to change the size of the sponge-like mesh by varying the amount of water to be added. The sponge-like product can be applicable to various foods. For example, a suitable amount of the textural protein food material can be incorporated into meat foods and processed marine products. In addition, although the application range of the krills is limited since the flesh thereof is fine, the method of the present invention makes it possible to form the flesh in uniform textural blocks. Therefore, it is possible to utilize the flesh as large-scale meat. Alternatively, it is possible to block the krill flesh by incorporating itself into the homogenate or the precipitate prior to the freezing processing of the present invention. In this way, it is now possible to markedly extend the application range of the krills.

The present invention is explained in more detail by reference to the following examples.

Example 1

A flesh protein was obtained by smashing thawed, fresh krills by the use of rubber rollers. After washing 100 grams of the flesh protein obtained above with water, water in an amount of 5 times the volume of the flesh protein was added thereto. The resulting mixture was homogenized uniformly in a homogenizer for 2 minutes. Thereafter, the mixture was centrifuged (6,000 rpm, 10 minutes) to thereby obtain a precipitate. To the thus-obtained precipitate was added water in an amount of twice the volume of the precipitate, and the resulting mixture was homogenized. Caustic soda was added to the resulting homogenate to adjust the pH to 10, and then hydrochloric acid was added to adjust the pH to 7.

After the pH adjustment with acid, calcium chloride was added to a concentration of up to 0.4% by weight, and the resulting mixture was then fully stirred and frozen at −5° C. for 2 days. The product obtained by thawing was a sponge-like protein having good elasticity. The texture of the product was measured, and the results are shown in Table 2.

Table 2

| Freezing Processing | pH Adjustment | Calcium Salt | Texture[1] |
|---|---|---|---|
| Before processing | Before adjustment | No addition | − |
| | | Addition | − |
| | After adjustment | No addition | − |
| | | Addition | − |
| After processing | Before adjustment | No addition | − |
| | | Addition | + |
| | After adjustment | No addition | ++ |
| | | Addition | +++ |

[1] Sponge-like texture.

The evaluation methods employed are the same as in Table 1.

Example 2

After 100 grams of a krill protein obtained in the same manner as in Example 1 were smashed in a homogenizer or kneader, they were centrifuged in the same manner as in Example 1 to thereby obtain a precipitate. The pH of the precipitate obtained above was adjusted to 10 by adding caustic soda, and then the pH was returned to 7 by adding hydrochloric acid.

After the pH adjustment with acid, calcium chloride was added to that the concentration thereof was 0.2% by weight. The resulting mixture was fully stirred, and it was then frozen at −5° C. for 3 days. The product obtained by thawing was a stiff meat-like protein. It had the texture as shown in Table 3.

Table 3

| Freezing Processing | pH Adjustment | Calcium Salt | Texture[1] |
|---|---|---|---|
| Before processing | Before adjustment | No addition | − |
| | | Addition | − |
| | After adjustment | No addition | − |
| | | Addition | − |
| After processing | Before adjustment | No addition | + |
| | | Addition | + |
| | After adjustment | No addition | ++ |
| | | Addition | +++ |

[1] Meat-like texture.

The evaluation methods are the same as in Table 1.

In carrying out the process of this invention, the pH of a precipitate is adjusted to a pH of not less than 10, and preferably from 10 to 11, by adding an alkali such as mentioned above. The alkali is preferbly in the form of an aqueous solution. The resulting mixture is mantained at such a pH for from 5 to 60 minutes, preferably from 10 to 20 minutes before an acid is added to adjust the pH to neutral. By "neutral", we mean a pH from about 6.5 to about 7.5, and preferably about 7.

As to acids which are used in adjusting pH, acetic acids, phosphoric acid and potassium biphosphate are also utilized suitably in the present invention. An acid such as HCN is not be suitable.

What is claimed is:

1. A process for producing textural protein food material from krills which comprises mixing uniformly the flesh of the krills, centrifuging the resulting mixture to obtain a precipitate, adjusting the pH of the precipitate to not less than 10, returning the pH to near neutral, and freezing the precipitate to effect texturing thereof.

2. The process according to claim 1, wherein water is added in an amount of from 1 to 10 times the volume of the krill flesh prior to mixing of the krill flesh.

3. The process according to claim 1, wherein water is added to the precipitate obtained by centrifugation in an amount of 1 to 4 times the volume of the precipitate.

4. The process according to claim 1, wherein a calcium salt is added to the precipitate after pH adjustment but before freezing.

5. The process according to claim 4, wherein the calcium salt is calcium chloride or calcium sulfate.

6. The process according to claim 4, wherein the amount of the calcium salt added is from 0.1 to 2% by weight based on the precipitate.

7. The process according to claim 1, wherein freezing of the precipitate is carried out at from −5° C. to −15° C. for at least two days.

8. The process according to claim 1, wherein the frozen precipitate is thawed.

9. A process for producing textural protein food material from krills which comprises mixing uniformly the flesh of the krills, separating solid material from the resulting mixture, adjusting the pH of the solid material to not less than 10, returning the pH to near neutral, and freezing the solid material to effect texturing thereof.

* * * * *